(12) United States Patent
Theilemann (10) Patent No.: US 8,281,761 B2
(45) Date of Patent: Oct. 9, 2012

(54) INTERNAL COMBUSTION ENGINE

(75) Inventor: Ludwig Theilemann, Schömberg-Schwarzenberg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 361 days.

(21) Appl. No.: 12/174,309

(22) Filed: Jul. 16, 2008

(65) Prior Publication Data

US 2009/0020097 A1    Jan. 22, 2009

(30) Foreign Application Priority Data

Jul. 16, 2007 (DE) .......... 10 2007 033 324
Oct. 31, 2007 (DE) .......... 10 2007 052 310

(51) Int. Cl.
*F02M 35/10* (2006.01)

(52) U.S. Cl. ............... 123/184.42; 123/184.43

(58) Field of Classification Search ........... 123/198 E, 123/184.21, 184.55, 184.54, 184.53, 184.56, 123/396, 399, 336; 251/129.12; 181/250, 181/299, 246

See application file for complete search history.

(56) References Cited

U.S. PATENT DOCUMENTS

| | | | |
|---|---|---|---|
| 3,298,332 A | 1/1967 | Elsbett | |
| 3,796,048 A * | 3/1974 | Annus et al. | 60/605.1 |
| 4,300,488 A | 11/1981 | Cser | |
| 6,192,850 B1 * | 2/2001 | Rutschmann et al. | 123/184.57 |
| 6,250,272 B1 | 6/2001 | Rutschmann et al. | |
| 7,171,933 B2 * | 2/2007 | Fegg et al. | 123/184.36 |
| 2003/0172653 A1 * | 9/2003 | Mayer et al. | 60/602 |

FOREIGN PATENT DOCUMENTS

| | | |
|---|---|---|
| DE | 1 526 312 | 2/1969 |
| DE | 22 45 732 C2 | 4/1973 |
| DE | 26 21 638 C2 | 11/1976 |
| DE | 32 32 366 C2 | 5/1983 |
| DE | 36 27 312 A1 | 2/1987 |
| DE | 296 00 060 U1 | 3/1996 |
| DE | 100 02 482 A1 | 7/2001 |
| DE | 601 00 234 T2 | 2/2004 |
| GB | 2 027 799 A | 2/1980 |
| GB | 2 108 582 A | 5/1983 |
| GB | 2 153 430 A | 8/1985 |
| JP | 5033660 A | 2/1993 |
| JP | 2000097033 A | 4/2000 |
| WO | 97/01026 A1 | 1/1997 |

OTHER PUBLICATIONS

German Patent and Trademark Office Search Report, dated Jul. 2, 2008.

* cited by examiner

*Primary Examiner* — Noah Kamen
*Assistant Examiner* — Keith Coleman (57) ABSTRACT

An internal combustion engine has a plurality of cylinders and an air intake system. The air intake system is formed from at least one distributor pipe, a plurality of intake pipes, and at least one plenum. The plenum is located between the distributor pipe and the intake pipes. Here, the combustion air is fed to the air intake system via an air guiding duct which opens out into the distributor pipe. The charge pressure of the combustion air is reduced between the outlet out of the compressor and the inlet into the combustion chamber of the internal combustion engine. A distributor pipe length is dimensioned as a function of an equivalent distributor pipe diameter such that it is possible for a reduction in the charge pressure to be obtained within the air intake system by way of an expansion, with the expansion taking place partially in the plenum in the respective intake pipe and/or within the distributor pipe.

22 Claims, 9 Drawing Sheets

INTERNAL COMBUSTION ENGINE

CROSS-REFERENCE TO RELATED APPLICATION

This application claims the priority, under 35 U.S.C. §119, of German patent applications DE 10 2007 033 324.4, filed Jul. 16, 2007 and DE 10 2007 052 310.8, filed Oct. 31, 2007; the prior applications are herewith incorporated by reference in their entirety.

BACKGROUND OF THE INVENTION

Field of the Invention

The invention relates to an internal combustion engine, in particular to a spark-ignition internal combustion engine. The generic internal combustion engine has a plurality of cylinders, an air intake system, a compressor for feeding the combustion air, and a combustion chamber which is arranged in the cylinder and which is delimited between a piston and a cylinder head. The air intake system is formed from at least one distributor pipe, a plurality of intake pipes and at least one plenum, with the plenum being positioned between the distributor pipe and the intake pipes. The combustion air is fed to the air intake system via an air guiding duct which opens out into the distributor pipe. The charge pressure of the combustion air is reduced between the outlet out of the compressor and the inlet into the combustion chamber of the internal combustion engine.

In the operation of internal combustion engines, use is conventionally made of air intake systems which provide ram or resonance pipe charging or a combination of these two charging types. In the case of a supercharged internal combustion engine, the compression of the combustion air which is sucked in results in an increase in the air temperature. The charging effect which is sought for naturally aspirated engines by means of ram pipe charging or resonance charging is undesirable in particular in supercharged spark-ignition engines since, as a result of the gas-dynamic compression, the charge air is heated, and there is an increasing tendency toward knocking combustion.

To prevent further charging, a charge-air cooler for cooling the charge air is therefore positioned downstream of the compressor in supercharged diesel and spark-ignition engines. This is intended to minimize the risk of a knocking engine, in particular in the case of supercharged spark-ignition engines. A further reduction in the charge-air temperature by means of a larger charge-air cooler is generally not possible for structural reasons. Accordingly, to increase the efficiency of the charge-air cooler, expansion devices are provided downstream thereof in order to further reduce a combustion air temperature. German published patent application DE 100 02 482 A1 discloses for example a device for charge-air cooling of said type, in which the combustion air which is at an increased charge pressure is expanded at a back-pressure valve. Here, the back-pressure valve is positioned between the charge-air cooler and the air intake system of the internal combustion engine.

German published patent application DE 36 27 312 A1 likewise discloses an expansion control device for lowering the charge-air temperature, by means of which expansion control device an adiabatic partial expansion of the supercharged air is obtained. Here, the expansion control device has a nozzle-like line section which is designed in the manner of a laval nozzle, with the nozzle-like line section being arranged in the intake line upstream of the air intake system.

The measures known from the prior art for cooling the charge air downstream of the outlet out of the charge-air cooler necessitate the arrangement of an expansion device in the intake line, and thereby entail additional structural expenditure in the engine bay of the vehicle.

SUMMARY OF THE INVENTION

It is accordingly an object of the invention to provide an internal combustion engine, which overcomes the above-mentioned disadvantages of the heretofore-known devices and methods of this general type and which provides for a supercharged internal combustion engine in which an optimized intake of air can be obtained.

With the foregoing and other objects in view there is provided, in accordance with the invention, an internal combustion engine, comprising:

a plurality of cylinders each formed with a combustion chamber delimited between a piston and a cylinder head;

an air intake system and a compressor for feeding combustion air into said combustion chamber;

said air intake system including at least one distributor pipe, a plurality of intake pipes connected to said cylinders, and at least one plenum positioned between said distributor pipe and said intake pipes;

a guiding duct communicating with said distributor pipe for feeding combustion air to said air intake system;

wherein a charge pressure of the combustion air is reduced between an outlet out of said compressor and an inlet into said combustion chamber; and wherein said air intake system is configured such that at least a portion of an air mass flows into said combustion chamber during an expansion phase of the air mass in the air intake system.

In other words, the internal combustion engine according to the invention is characterized in that the air intake system is designed such that the intake of air into the combustion chamber takes place during an expansion phase of the air mass in the air intake system. Accordingly, at least a part of the air mass flows into the combustion chamber during the expansion phase. Here, the charge-air expansion takes place partially in the plenum, in the respective intake pipe and/or within the distributor pipe. According to the invention, it is possible to obtain a continuous, but not imperatively uniform, expansion between the inlet of the combustion air into the distributor pipe and the flow of the combustion air into the combustion chamber, that is to say the outlet out of the intake pipe.

According to the invention, the air intake system has a distributor pipe length which is such that the intake of air into the combustion chamber of the internal combustion engine takes place during an expansion phase of the air mass in the air intake system. The distributor pipe length is preferably dimensioned such that, at the time of the intake of air, it is possible to obtain a reduction in the charge pressure within the air intake system. With the design of the air intake system according to the invention, in particular the dimensioning of the distributor pipe length, resonance effects at maximum engine power are avoided, and an air intake behavior is also permitted which serves to provide a targeted expansion, tuned to the time of intake.

The embodiment of the air intake system according to the invention permits a method for the intake of air, by means of which method, at the time of the intake of air, the temperature of the air mass sucked in by the respective cylinder is reduced between the plenum and the combustion chamber of the internal combustion engine. The air mass temperature is preferably reduced below a mean temperature value. The temperature values of the air mass within the air intake system fluctuate about a mean temperature value of said type. A mean temperature value of said type is set approximately in the center of the distributor pipe.

The air intake system according to the invention is characterized in that the distributor pipe length is dimensioned as a function of an equivalent distributor pipe diameter. In this way, the oscillating air in the air intake system is sucked into the respective combustion chamber during the relatively cool expansion phase, such that a relatively low temperature of the fuel/air mixture is present in the combustion chamber.

With the design of the air intake system according to the invention, by means of the expansion which is obtained, effective cooling of the charge air within the air intake system is provided without using additional moving components. In this way, a cost-effective and efficient air intake system for supercharged internal combustion engines is provided, with the expansion air intake system according to the invention being suitable both for supercharged spark-ignition engines and also for diesel engines.

In one embodiment of the invention, the distributor pipe length is dimensioned as a function of a nominal rotational speed of the internal combustion engine. Optimum use of the present air intake system is therefore made in supercharged internal combustion engines, and targeted tuning for higher load points and rotational speeds is permitted in particular in sports cars.

With the air intake system according to the invention, the temperature of the sucked-in air mass in the plenum falls below the mean value between a crank angle range of between 90° after charge-exchange top dead center and 20° after charge-exchange bottom dead center. In this way, it is possible to obtain a temperature reduction of more than 20°. Accordingly, a significant shift of the ignition angle in the early direction is permitted, such that the efficiency of the internal combustion engine is improved. As a result of the earlier ignition time, the exhaust-gas temperature falls, such that a requirement for enrichment to protect the exhaust-gas turbine is reduced. As a further result of the improvement in efficiency, less charge air and fuel is required for the same engine power, as a result of which the entire supercharging process of the internal combustion engine is optimized.

According to a further aspect of the invention, the distributor pipe length is designed as a function of an equivalent distributor pipe diameter such that a ratio of equivalent distributor pipe diameter to distributor pipe length is 0.05 to 0.14. Here, the intake pipe length should be dimensioned to be no more than 200 mm or 150 mm, in particular at a nominal rotational speed of between 5500 and 7000 revolutions per minute. Here, the ratio of equivalent distributor pipe diameter to distributor pipe length is preferably 0.066, 0.114 or 0.136. In this way, an optimized expansion of the compressed combustion air takes place within the air intake system, such that the combustion air flows at a considerably lower temperature from the air intake system into the inlet duct in the cylinder head.

As a result of the new geometric design of the distributor pipe of the air intake system, a distributor pipe is provided which has a small diameter in relation to conventional intake systems, such that the structural expenditure in the engine bay is optimized. The air intake system according to the invention completely reverses the known resonance charging effect, in particular at high engine rotational speeds. Instead of a compression, an expansion of the combustion air is obtained, and said combustion air is cooled further. The fuel/air mixture in the combustion chamber is therefore at a lower temperature, so that the ignition time of the internal combustion engine can be set optimally in terms of performance.

In a further embodiment of the invention, the internal combustion engine has one or two cylinder rows, with the total number of cylinders being six. According to the invention, it has been found in a spark-ignition 6-cylinder internal combustion engine of the Boxer type that the present air intake system leads to a considerable improvement in efficiency. The present air intake system is nevertheless likewise suitable for internal combustion engines with four cylinders.

In one embodiment of the invention, to obtain a further improvement in the cylinder charge, in particular in supercharged spark-ignition internal combustion engines, the present invention provides an additional increase in the charge pressure by the compressor in order to compensate the reduced charge-pressure contribution by the expansion obtained within the air intake system. A charge pressure which is higher by 3 to 10% than the conventional charge pressures is preferably set for the same engine power. Here, the conventional charge pressures are between 0.9 bar and 1.5 bar.

As a result of a higher charge pressure being set, the combustion air temperature downstream of the compressor increases, such that as a result of the higher temperature level of the combustion air which is set, a greater quantity of heat is dissipated in the charge-air cooler. According to the invention, a temperature difference across the charge-air cooler is provided which is approximately 3 to 10% higher than at conventional charge pressures. In this way, a combustion air temperature downstream of the charge-air cooler is only slightly higher than that obtained with conventional supercharging, since the heat quantity dissipated at the charge-air cooler is up to 55% higher than under conventional charge pressure conditions. The additional thermal gain obtained by means of the use of the air intake system according to the invention leads to a lower temperature of the fuel/air mixture in the combustion chamber, since both the pressure level and also the temperature level in the combustion chamber at the inlet valve closing time are between 3 and 4% lower than in conventional air intake systems. Accordingly, in a sports vehicle with a supercharged engine, it is possible, in particular at high load points and rotational speeds, to obtain a more favorable fuel consumption or a higher engine power for the same fuel consumption.

In a further advantageous embodiment of the invention, in the internal combustion engine according to the invention, as a result of the use of an exhaust-gas turbocharger with a variable turbine geometry in combination with the expansion air intake system according to the invention, the obtained expansion of the combustion air within the air intake system is constantly adapted to the operating state of the engine. In this way, it is possible in the internal combustion engine according to the invention to obtain an optimization of the ignition time and therefore a further improvement in efficiency.

Other features which are considered as characteristic for the invention are set forth in the appended claims.

Although the invention is illustrated and described herein as embodied in internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Referring now to the figures of the drawing in detail, an internal combustion engine 1 with supercharging has at least one cylinder 2 in which a non-illustrated combustion chamber is formed between a piston, which is held in the cylinder 2 in a longitudinally movable manner, and a cylinder head. The internal combustion engine 1 sucks in combustion air by means of a compressor 8. The supercharging of the internal combustion engine 1 can be generated within the context of the invention by a compressor 8 which is formed as a constituent part of an exhaust-gas turbocharger, of a mechanical compressor or of an electrical compressor. As a result of the compression of the combustion air, the charge-air temperature increases. In order to reduce said charge-air temperature, a charge-air cooler 9 is positioned downstream of the compressor 8.

Figure 1:
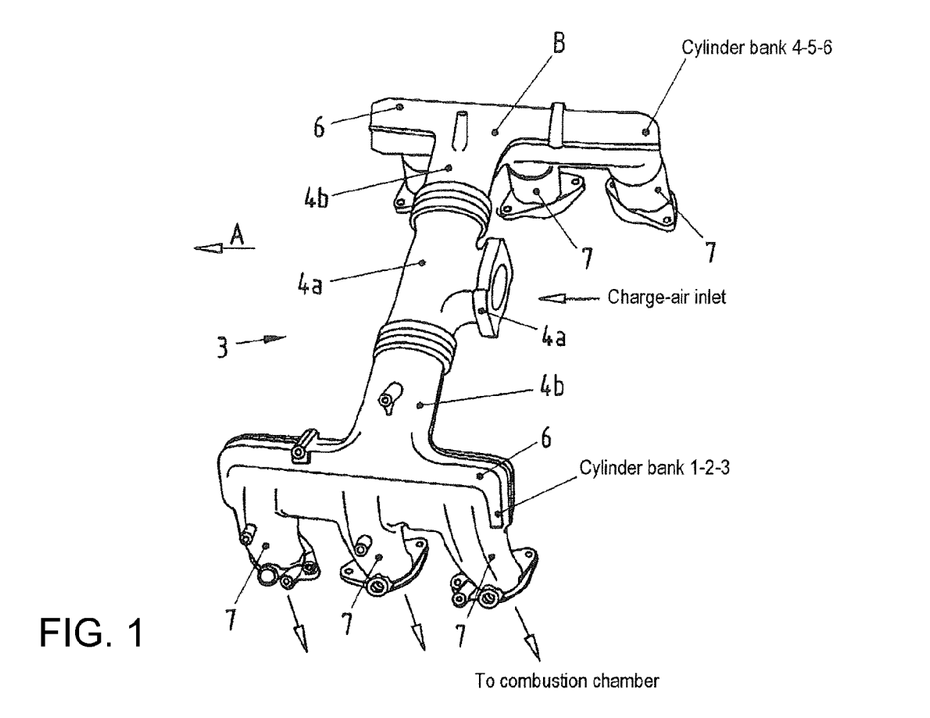
FIG. 1 shows an image of an air intake system according to the invention with cylinders arranged in two rows.
Figure 1A:
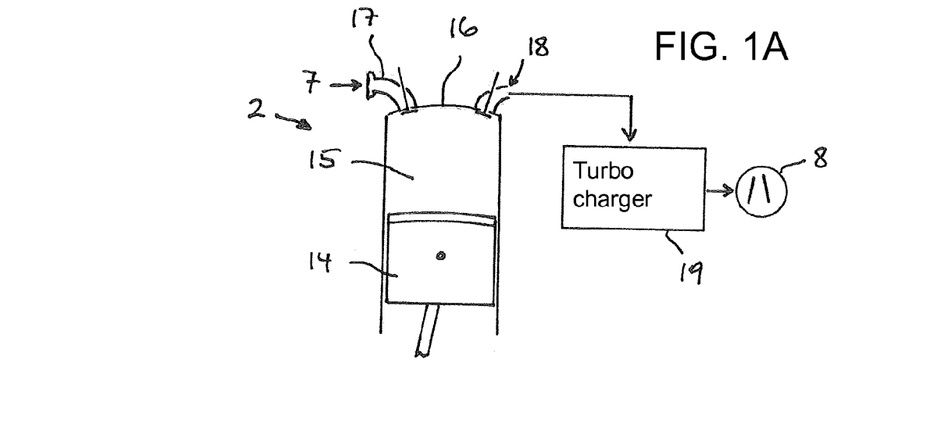
FIG. 1A is a simplified sectional view through a cylinder of an internal combustion engine.

FIG. 1A shows a cylinder 2 in highly diagrammatic form. A piston 14 is vertically movable within the cylinder between a TDC position and a LDC position. A combustion chamber 15 is delimited between the piston 14 and a cylinder head 16. An intake port 17 is connected to an intake pipe 7 of an air intake system 3. Exhaust air is exhausted through an exhaust port 18. In a preferred embodiment, the exhaust air is utilized to drive an exhaust-gas turbocharger 19.

FIG. 1 shows the air intake system 3 which is embodied according to the invention. Charge air is fed into a distributor pipe 4 through an air guiding duct 5. The air intake system 3 illustrated in FIG. 1 is designed for an internal combustion engine 1 with two cylinder rows such that one intake manifold or plenum 6 is provided for each cylinder row. Here, the supply of air takes place in the center of the distributor pipe 4. A non-illustrated throttle flap housing is flange-mounted there. Three intake pipes 7 per cylinder row are provided on each plenum 6, via which intake pipes 7 the charge air can be supplied to the non-illustrated inlet duct in the cylinder head and subsequently to the combustion chamber. The two plenums 6 are connected to a central distributor pipe 4. Here, the respective plenum 6 is formed in one piece with the intake pipes 7. According to the present invention, a distributor pipe 4 is arranged between the two plenums 6, which distributor pipe 4 is formed in the present exemplary embodiment from a distributor module 4a and from two pipe sections 4b which are formed in one piece with the respective plenum. The connection can take place by means of clips or with a bayonet-type fastener.

According to the invention, a distributor pipe length $L_V$ is dimensioned in dependence on an equivalent distributor pipe diameter $D_V$ such that a reduction in the charge pressure of the combustion air takes place within the air intake system 3 by means of a targeted expansion, with the expansion taking place partially in the plenum and/or within the distributor pipe. According to the invention, the expansion takes place in a region between an inlet of the combustion air into the distributor pipe 4, for example from the distributor module 4a, and an outlet out of the intake pipe 7. Depending on the ignition sequence of the respective cylinders 2, an oscillation occurs within the air intake system, with it being possible to obtain a continuous, but not imperatively uniform, expansion of the charge air in relation to the respective combustion chamber within the air intake system. In this way, the charge-air temperature at the inlet into the combustion chamber and therefore the fuel/air mixture temperature in the combustion chamber can be lowered, such that the engine power can be increased with a simultaneous reduction in the specific fuel consumption.

According to the present invention, the oscillating air in the air intake system 3 is sucked in for mixture preparation during the relatively cool expansion phase, as a result of which the temperature of the fuel/air mixture in the combustion chamber is reduced. This leads to a considerable increase in efficiency. For example, a reduction in fuel consumption by approximately 15% is obtained at maximum power of a six-cylinder Boxer engine.

The present invention is wherein the expansion intake system 3 described here is highly suitable for internal combustion engine 1 with six or four cylinders. For a supercharged six-cylinder engine, the distributor pipe length $L_V$ is determined by the following formula:

$$200 - 4/3 * L_S + 1.7 * n_N^{-2.22} * (D_V - 30) < L_V < 7.2 * 10^6/n_N - 1.5 * L_S$$

In the case of a supercharged four-cylinder engine, the range for the distributor pipe length $L_V$ in which the expansion intake system can obtain advantageous results is determined by the following formula:

$$34 * D_V - 650 - 4/3 * L_S < L_V$$

Here, $L_S$ corresponds to an intake pipe length between the plenum 6 and the cylinder head (not illustrated). The value $L_V$ represents the distributor pipe length, wherein the latter is determined differently depending on the exemplary embodiment. $L_V$ is the pipe length of the connecting pipe between the first and the second plenum 6. In the exemplary embodiments with the tank 4c and 11 as per FIGS. 3 and 5 respectively, $L_V$ is the sum of the distributor pipe sections $L_V = L_{V1} + L_{V2}$. Furthermore, $n_N$ corresponds to a nominal rotational speed of the internal combustion engine, at which a maximum power is obtained.

In the case of a distributor pipe 4 with a variable cross-sectional area $A_V(x)$, the internal volume $V_V$ of the connecting pipe is determined by means of the following formula:

$$V_V = \int A_V(x) dx, \text{ where } A_M = V_V/L_V$$

Here, x is the path coordinate along a pipe center line. Regions in which $A_V(x)$ is greater than double the mean cross-sectional area $A_M$ are considered to be not a tube but a tank, and are not included in the calculations of the pipe length $L_V$ and of the equivalent connecting pipe diameter $D_V$.

From this, the equivalent connecting pipe diameter $D_V$ is determined according to the formula:

$$D_V = \sqrt{4 A_M / \pi}$$

Figure 2:
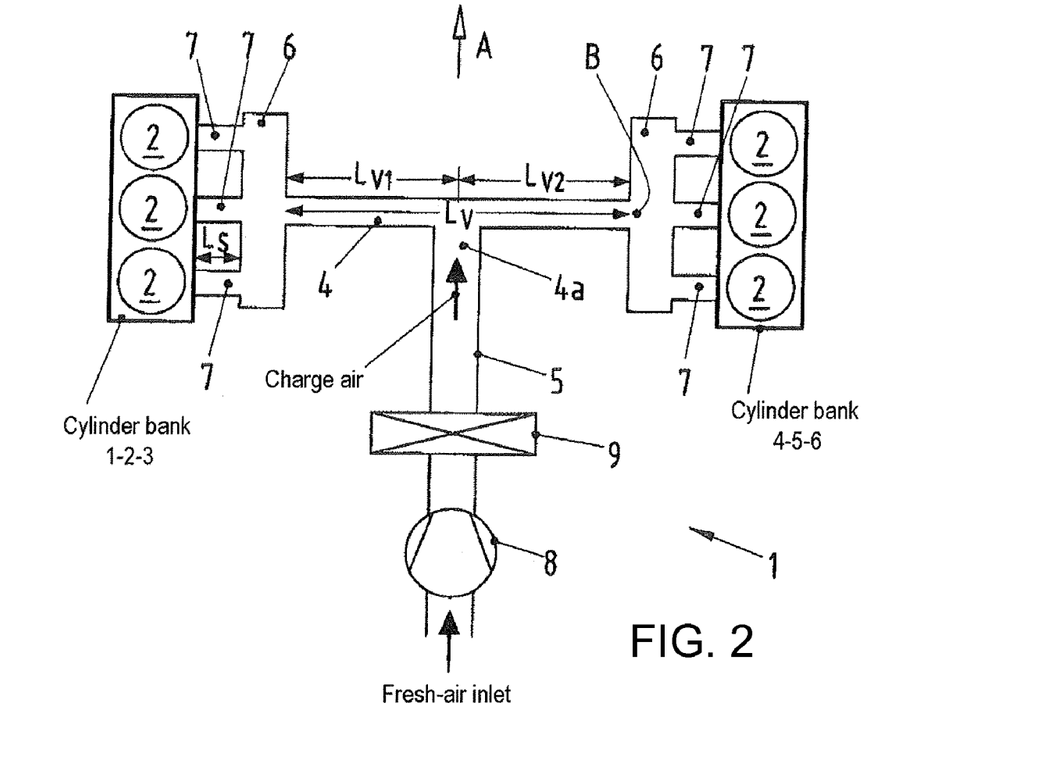
FIG. 2 is a schematic illustration of the air intake system according to FIG. 1 as per a first exemplary embodiment.

In the first exemplary embodiment as per FIG. 2, the distributor pipe length $L_V$ is equal to the spacing between the two plenums 6. In the second exemplary embodiment as per FIG. 3, the distributor pipe length $L_V$ is composed of the lengths of the two sections $L_{V1}$ and $L_{V2}$, wherein in the third exemplary embodiment as per FIG. 4, the distributor pipe length of corresponds to the curve length of the distributor pipe 4. In the fourth exemplary embodiment as per FIG. 5, the distributor pipe length $L_V$ is composed of the two section lengths $L_{V1}$ and $L_{V2}$. In the fifth exemplary embodiment, according to FIG. 6, the distributor pipe length $L_V$ is equal to the spacing between the two plenums 6, wherein in the sixth exemplary embodiment as per FIG. 7, the distributor pipe length corresponds to the curve length of the distributor pipe 4.

According to the invention, a design of the expansion intake system 3 which adheres to the above formulae results in advantageous low temperatures at the inlet opening of the combustion chamber. It is possible to obtain high degrees of expansion in the case in particular of a distributor pipe length of approximately 440 mm and an equivalent distributor pipe diameter $D_V$ of 50 or 60 mm or between 50 and 60 mm. Here, the intake pipes 7 have a length $L_S$ which is less than 200 or 150 mm, preferably between 110 and 140 mm. Accordingly, the design of the distributor pipe length $L_V$ is to be selected as a function of the equivalent distributor pipe diameter $D_V$ so as to give a ratio of equivalent distributor pipe diameter $D_V$ to distributor pipe length $L_V$ in a range from 0.05 to 0.14, in particular in a range from 0.06 to 0.13. It has been found here that, in a six-cylinder engine, ratios of 0.066, 0.114 or 0.136 or ratios which lie between these values have led to optimum results within the context of the present invention, in particular if the intake pipe length $L_S$ is shorter than 150 mm.

The internal combustion engine 1 described here operates on the four-stroke principle, with the present invention likewise being suitable for two-stroke internal combustion engines. The longitudinal movement of the piston extends between a top dead center TDC and a bottom dead center BDC. In the first intake stroke of the four-stroke internal combustion engine 1, combustion air is supplied to the combustion chamber through an inlet duct or an intake pipe 7, with the piston moving in a downward movement from a charge-exchange dead center CE-TDC to a charge-exchange bottom dead center BDC. In a subsequent compression stroke, the piston moves in an upward movement to an ignition top dead center ITDC, around which the ignition is carried out. Thereafter, the piston expands in a downward movement to a bottom dead center, wherein in a final stroke, the piston, in an upward movement to a charge-exchange top dead center CE-TDC, forces the gases out of the combustion chamber.

Figure 8:
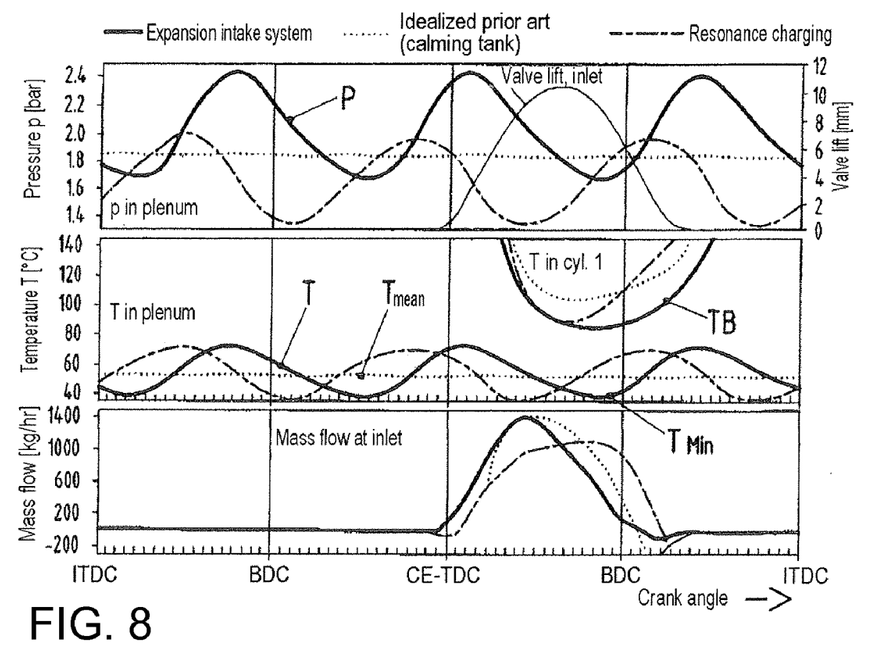
FIG. 8 shows a schematic diagram of the pressure, temperature and mass flow profiles within the air intake system of the internal combustion engine according to the invention.

The plenums 6 shown in FIG. 2 are connected to the distributor pipe 4, with said distributor pipe 4 being designed such that the combustion air is supplied to the respective combustion chamber at a time at which, in the plenum 6, a charge-air pressure prevails which is lower than the charge-air pressure which prevails in the air guiding duct 5. To illustrate the effect obtained by means of the air intake system 3 according to the invention, FIG. 8 illustrates some air state profiles in the plenum 6 and in the intake pipe 7 of the internal combustion engine 1. Here, the curve for the calming tank represents an idealized prior art. Said system is designed with a very large intake volume, such that no pressure fluctuations occur within the intake system. Here, a system of said type serves for evaluation, since it usually rarely comes into the question for practical use from packaging, weight and drivability aspects.

The dimensions of the air intake systems compared in FIG. 8 were selected, to better illustrate the characteristic features, so as to make the typical differences readily apparent. The selected diameter of the resonance pipe of the resonance intake system taken into consideration for comparison is 120 mm, the pipe length was tuned for 6000 rpm. The intake tanks or plenums 6 correspond to those of a sports car with six cylinders. The intake pipes were assumed to be equal, and to be extremely short with a length of 50 mm, in all three examples.

The upper diagram of FIG. 8 shows the pressure profiles in the plenum 6 as per FIGS. 13 to 16. During the intake from the calming tank with a volume of approximately 15 liters, virtually no pressure amplitudes occur. The constant pressure in the tank denotes the charge pressure. In the case of resonance charging, the charge pressure P, that is to say the value averaged over time, is approximately 0.25 bar lower because the resonance charging is in addition to the charging by the compressor. In the expansion intake system, the charge pressure P is approximately 0.25 bar above that of the calming tank system, and 0.5 bar above that of the resonance system. The pressure amplitudes are considerably higher than those known from naturally-aspirated engines, since as a result of the higher density of the charge air, a correspondingly greater mass oscillates between the plenums 6.

As per FIG. 8, the phase positions of the pressure oscillation differ by approximately 70° crank angle. A phase difference of up to 90° is nevertheless possible by means of other geometries. Different mass flow profiles are generated at the inlet on account of the phase position of the pressure P. If, for example, one compares the mass flow profile with the temperature profile in the plenum 6 of the cylinder bank row 1-2-3 as per FIG. 8 and FIGS. 13 to 16, it can be seen that, in the expansion intake system, over 120 degrees crank angle from 90 degrees after charge-exchange top dead center CE-TDC to 20 degrees after charge-exchange bottom dead center BDC, the temperature in the plenum 6 falls below its mean value $T_{mean}$.

The result is shown finally in the temperature profile $T_B$ in the combustion chamber of the first cylinder. In relation to the calming tank intake system, which is intended to represent the idealized prior art, a temperature reduction by more than 20 degrees is obtained. This effect permits, as per FIG. 10, for conventional engine designs, a considerable displacement of the ignition angle in the early direction. This improves the high-pressure efficiency, and the engine power rises corresponding to FIG. 11. With earlier ignition, the exhaust-gas temperature falls, such that the requirement for enrichment to protect the exhaust-gas turbine is reduced.

As illustrated in the upper diagram of FIG. 8, a maximum valve lift is set at the inlet in a second half of the intake stroke, that is to say between charge-exchange top dead center CE-TDC and bottom dead center BDC. As illustrated in the middle diagram in FIG. 8, the temperature of the combustion air has a minimum value $T_{min}$ in the second half of the intake stroke as a result of the expansion in the plenum 6. The present invention is wherein the air intake system 3 according to the invention is designed such that, at the time of the intake of combustion air, a gas-dynamic expansion prevails within the air intake system 3, in particular in the plenum 6 and in the intake pipes 2. In this way, the combustion air substantially has a low temperature $T_{min}$ when the combustion air flows into the combustion chamber.

Figure 3:
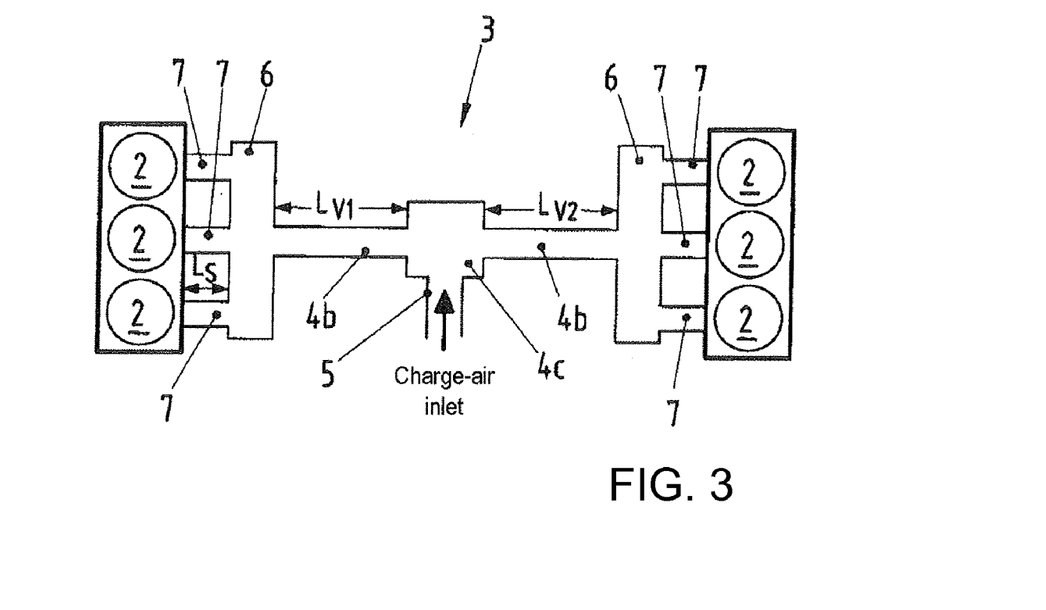
FIG. 3 is a schematic illustration of the air intake system as per FIG. 1 as per a second exemplary embodiment.
Figure 4:
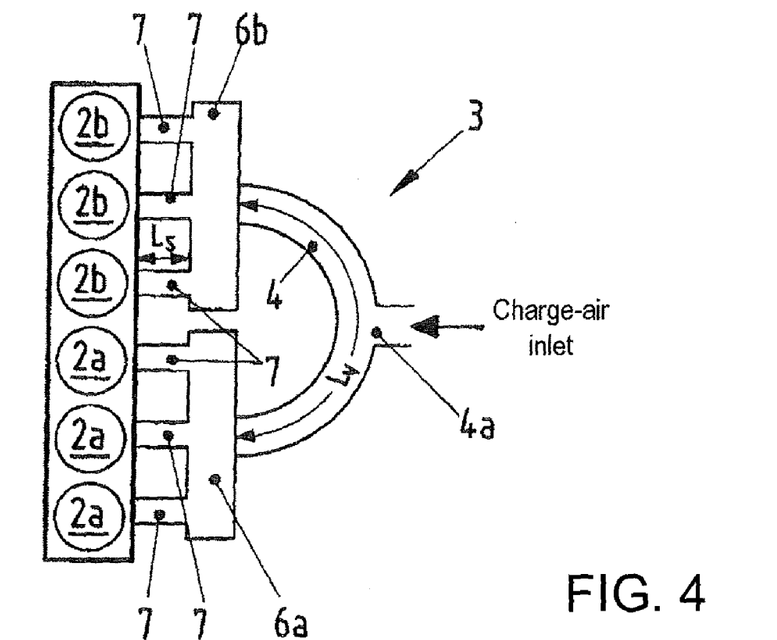
FIG. 4 is a schematic illustration of an air intake system according to the invention with cylinders arranged in one row, as per a third exemplary embodiment.

FIG. 3 illustrates a second exemplary embodiment in which a tank 4c is provided in the center of the distributor pipe 4 instead of the distributor module 4a. In this exemplary embodiment, the distributor pipe length $L_V$ is composed of the spacings between the respective plenum 6 and the tank 4c. According to a third exemplary embodiment as per FIG. 4, the internal combustion engine 1 according to the invention likewise has six cylinders which are arranged in a row. Here, the air intake system 3 is designed such that the combustion air is split up in such a way that a first plenum 6a is provided for the three front cylinders 2a, with a second plenum 6b being provided for the other three cylinders 2b. For this purpose, the distributor pipe 4 is of curved design, with the distributor pipe length $L_V$ corresponding to the length of the curve. According to the invention, the distributor pipe 4 can, depending on the cylinder arrangement and engine design, be of any conceivable form within the context of the invention, for example curved, straight or angular, or can be designed as a combination of different forms.

Figure 5:
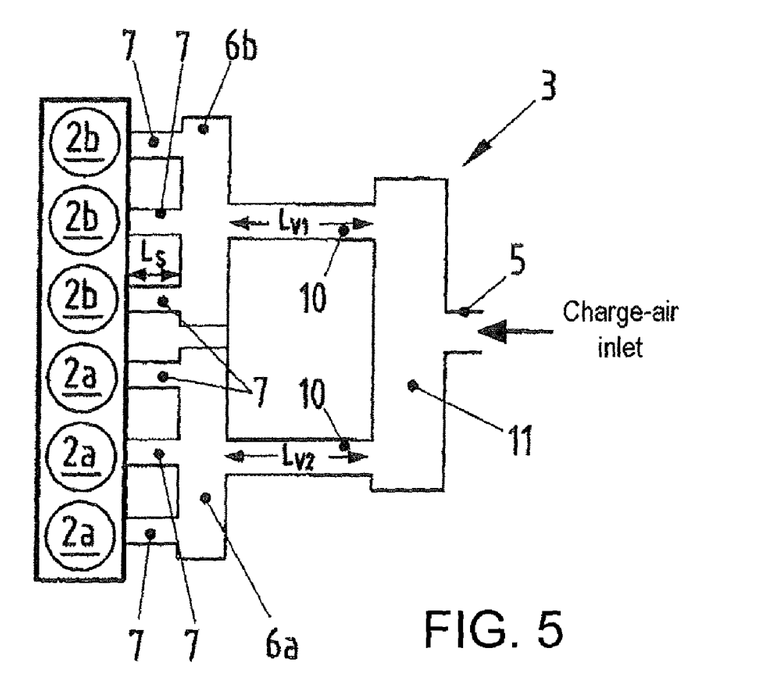
FIG. 5 is a schematic illustration of the air intake system as per FIG. 4 as per a fourth exemplary embodiment.

A modified form of the third exemplary embodiment as per a fourth exemplary embodiment is illustrated in FIG. 5, with the distributor pipe 4 being split up here into two sections, with a tank 11 being positioned between the air guiding channel 5 and the respective distributor pipe sections 10. In this exemplary embodiment, the distributor pipe length $L_V$ is composed of the two distributor pipe section lengths $L_{V1}$ and $L_{V2}$.

Figure 6:
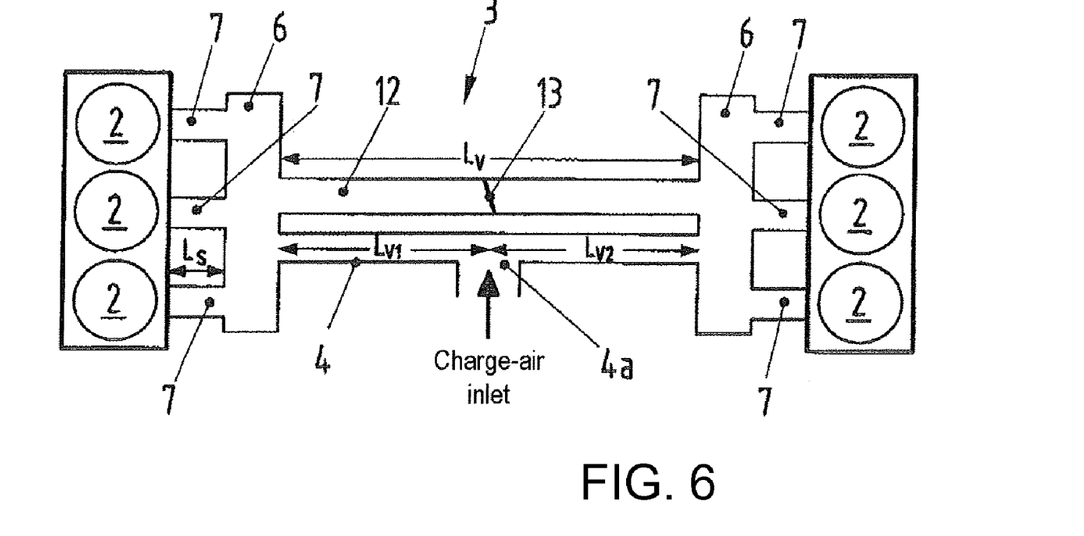
FIG. 6 is a schematic illustration of the air intake system as per FIG. 1 as per a fifth exemplary embodiment.
Figure 7:
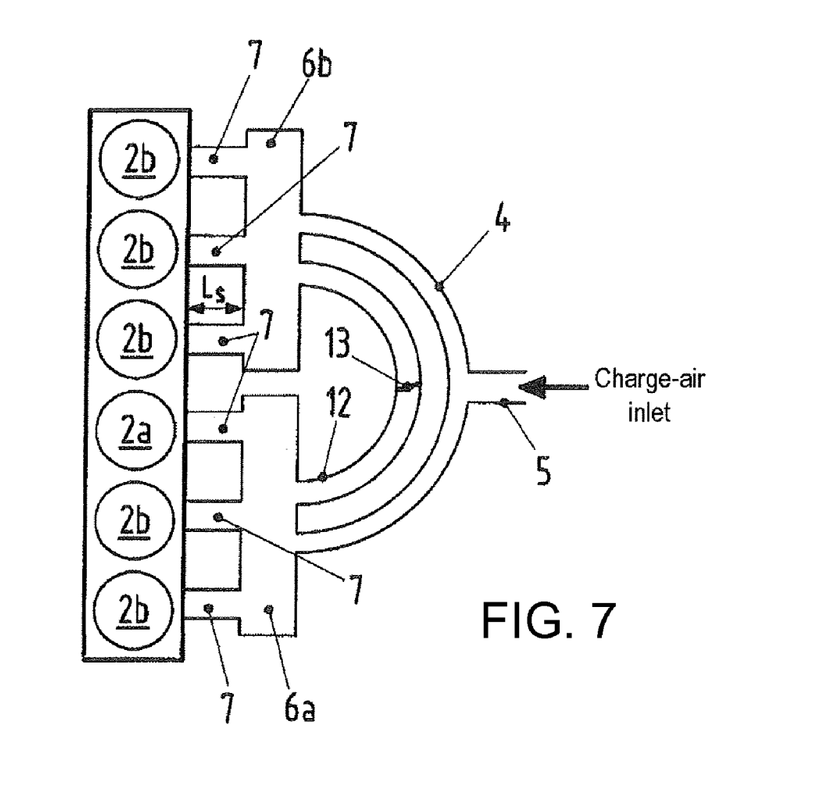
FIG. 7 is a schematic illustration of the air intake system as per FIG. 4 as per a sixth exemplary embodiment.

According to a fifth exemplary embodiment of the invention as per FIG. 6, an additional distributor pipe 12 is arranged between the plenums 6, which additional distributor pipe 12 can be activated as a function of engine parameters by a switching element, embodied in this case as a flap 13. The switching flap 13 arranged in the additional distributor pipe 12 serves to adjust the size of the equivalent distributor pipe diameter $D_V$. In this way, the obtainable expansion of the charge air can be adjusted as a function of the rotational speed of the internal combustion engine 1. The arrangement of an additional distributor pipe 12 with a switching flap 13 is likewise conceivable in all of the exemplary embodiments described above. Here, depending on the form of the distributor pipe, one or two additional distributor pipes 12 are to be positioned at the corresponding points for adjusting the size of the equivalent distributor pipe diameter $D_V$. The sixth embodiment shown in FIG. 7 represents a modified form of the fifth embodiment illustrated in FIG. 4.

Figure 12:
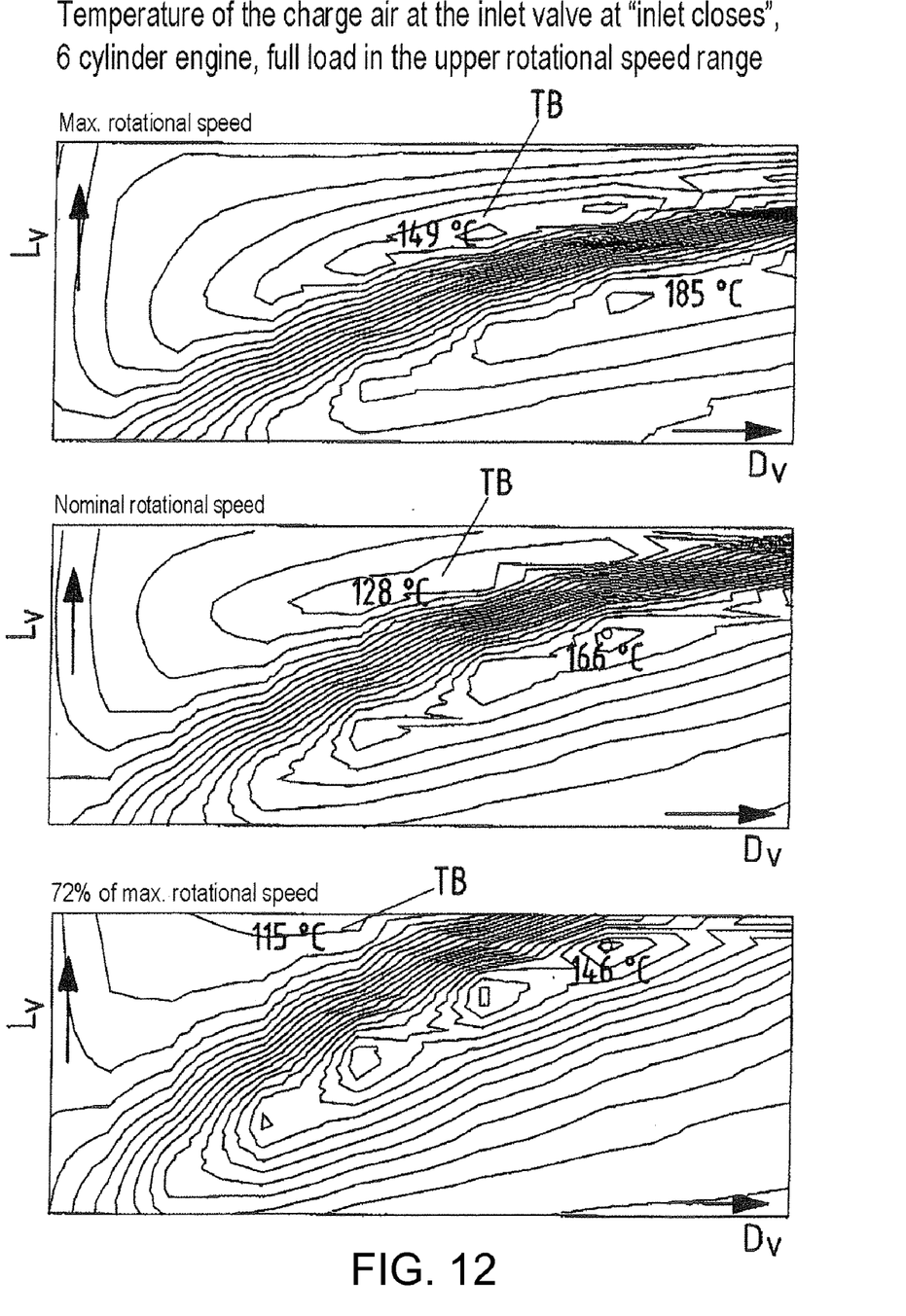
FIG. 12 is a schematic illustration of the temperature values of the cylinder charge in the combustion chamber of an internal combustion engine according to the invention at the time "inlet valve closes" as a function of the set rotational speed.

FIG. 12 shows exemplary profiles of the charge temperature $T_B$ in the combustion chamber after the end of the inflow of expanded charge air into the combustion chamber. The three images from FIG. 12 illustrate different temperature values as a function of the rotational speed of the internal combustion engine 1. It is therefore possible by means of the additional switchable distributor pipe 12 to set a certain equivalent distributor pipe diameter $D_V$ as a function of operating parameters of the internal combustion engine, such as the rotational speed, and to thereby obtain a tuned expansion of the charge air. Accordingly, it is made possible to set a lowest temperature of the charge air at the time of inlet into the combustion chamber as a function of the operating parameters, such that optimum efficiency is obtained at the respective operating point of the internal combustion engine 1.

Figure 9:
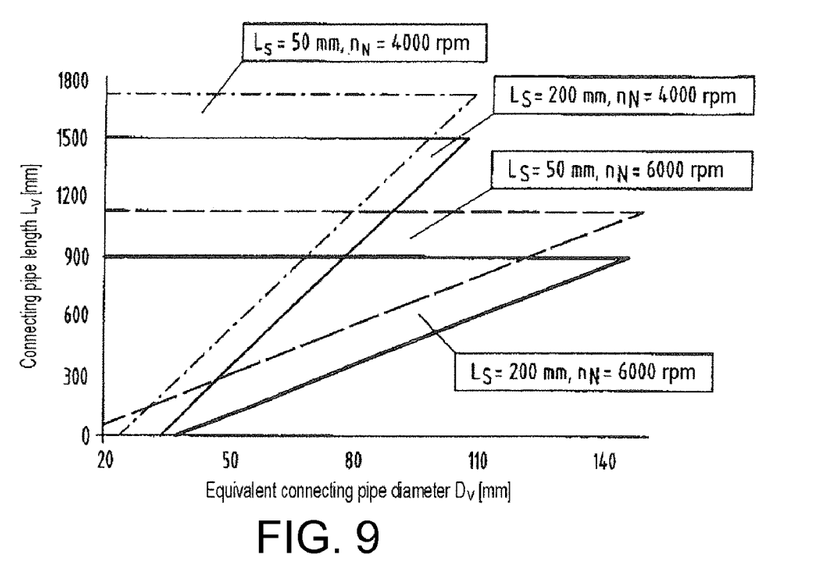
FIG. 9 shows a schematic image of the dimensional ratios of the air intake system of the internal combustion engine according to the invention.

The expansion intake system 3 according to the invention and its design are explained in more detail below. The schematic illustration in FIG. 9 of the dimensional ratios of the air intake system 3 as per FIG. 1 are derived in accordance with the temperature profiles of the charge air in FIG. 12. Here, the triangles illustrated in FIG. 9 illustrate the temperature ranges with the low temperature values of the charge air from FIG. 12. Here, the distributor pipe length $L_V$ is to be selected as a function of the equivalent distributor pipe diameter $D_V$ so as to give a point of intersection within one of the triangles shown in FIG. 9. With such a design, in the expansion intake system 3 according to the invention, a charge-air temperature $T_{Min}$ which is lower than a mean temperature $T_{mean}$ is generated at the inlet of the combustion chamber.

The geometric design of the air intake system 3 leads to a charge air expansion which is such that the expansion phase of the charge air oscillation lies in the second half of the second intake process as per FIG. 8, upper diagram. In FIG. 8, the second half of the intake process, the lowest temperature values of the charge air occur in the expansion phase. The relatively cold air masses which are sucked in result, according to the invention, in a combustion chamber cylinder charge with a relatively low temperature. This effect causes the knock limit to be displaced in the early direction as per FIG. 11, so as to permit an earlier ignition.

Accordingly, the engine power can be increased by virtue of the ignition time of the internal combustion engine 1 being set earlier than in the case of a relatively warm cylinder charge. This leads to a significant increase in power. As a result of the obtained reduced knock tendency, it is conceivable for the compression ratio of the internal combustion engine to be raised.

Figure 10:
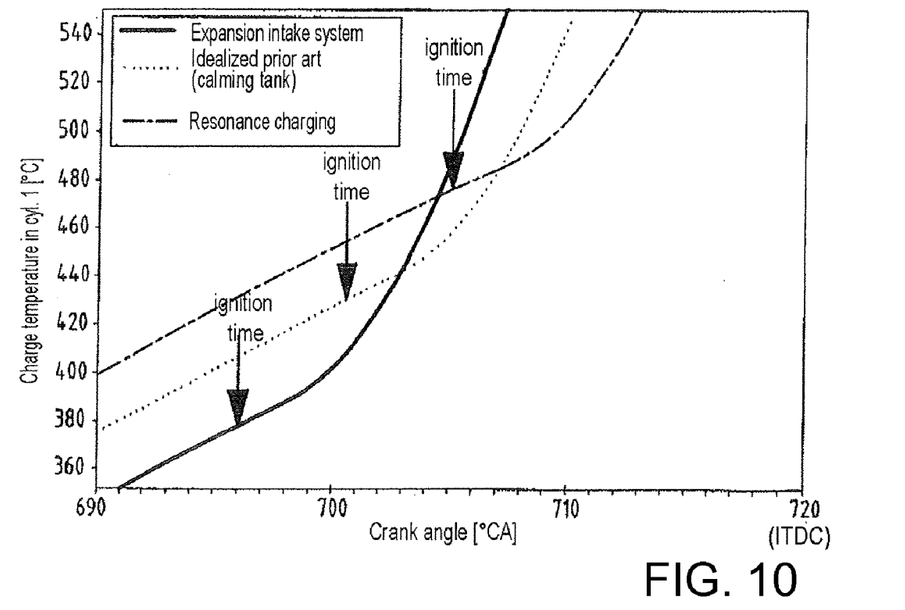
FIG. 10 is a schematic illustration of the charge temperature in the combustion chamber of an internal combustion engine.
Figure 11:
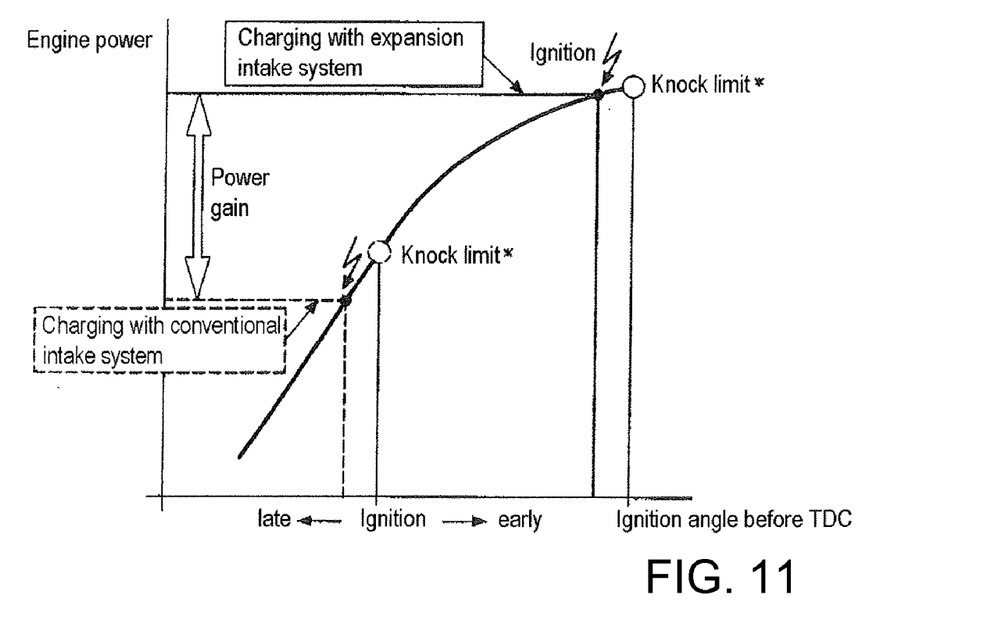
FIG. 11 is a schematic illustration of the effect of the air intake system as per FIG. 1 on the engine power of an internal combustion engine.

In order to compensate the obtained expansion in the air intake system 3, a suitable charge pressure is set by means of the compressor 8, which charge pressure is higher than in conventional supercharged internal combustion engines. An increase in the charge pressure with the present expansion air intake system 3 can for example be between 0.15 and 0.3 bar higher than in conventional intake systems. A charge pressure increase of said type results in a charge-air temperature increase by approximately 10 degrees upstream of the charge-air cooler 9, with a charge-air temperature increase of approximately 2 to 3 degrees being measured downstream of the charge-air cooler 9. Accordingly, a further reduction in the charge-air temperature is brought about by means of the generated expansion, such that a lower charge-air temperature than the conventional temperatures as per FIGS. 8 and 10 is obtained at the inlet of the combustion chamber while maintaining the desired charge pressure level. The relatively high air throughput in the combustion chamber is therefore maintained, and at the same time, a power increase is obtained as a result of the displacement of the knock limit of the internal combustion engine 1 as per FIGS. 10 and 11.

The present invention is explained in detail on the basis of the air intake system 3 for a six-cylinder engine with two cylinder banks. In comparison with a classic intake system in an engine of said type, the distributor pipe 4 of the air intake system 3 is longer and of smaller diameter, with the individual intake pipes 7 being of shorter design.

With the present invention, the air intake system according to the invention reverses the resonance charging effect at relatively high engine rotational speeds, so that instead of a compression, an expansion is utilized. As a result of said expansion within the air intake system 3, the air is expanded. As a result, the air is cooled, such that a relatively low temperature of the fuel/air mixture is generated in the combustion chamber. In this way, the relatively cool fuel/air mixture can be ignited optimally in terms of power.

In FIG. 8, in the case of resonance charging, the charge pressure, that is to say the value averaged over time, is approximately 0.25 bar lower because the resonance charging is in addition to the charging by the compressor. In the air intake system 3 according to the invention, in contrast, the charge pressure is approximately 0.25 bar above that of the calming tank system, and 0.5 bar above that of the resonance system. Here, the pressure amplitudes are considerably higher than those of naturally-aspirated engines, since as a result of the higher density of the charge air, a correspondingly greater mass oscillates between the plenums 6. The phase positions of the pressure oscillation differ by approximately 70° crank angle. Different mass flow profiles are generated at the inlet, as per the lower diagram in FIG. 8, on account of the phase position of the pressure. Here, it can be seen in the middle diagram in FIG. 8 that, in the air intake system 3 according to the invention, the temperature in the plenum 6 falls below its mean value $T_{mean}$. This effect is clear in the temperature profile, where the fall in temperature is more than 20° during an intake phase between 90° crank angle after charge-exchange top dead center and 20° crank angle after bottom dead center.

Figure 13:
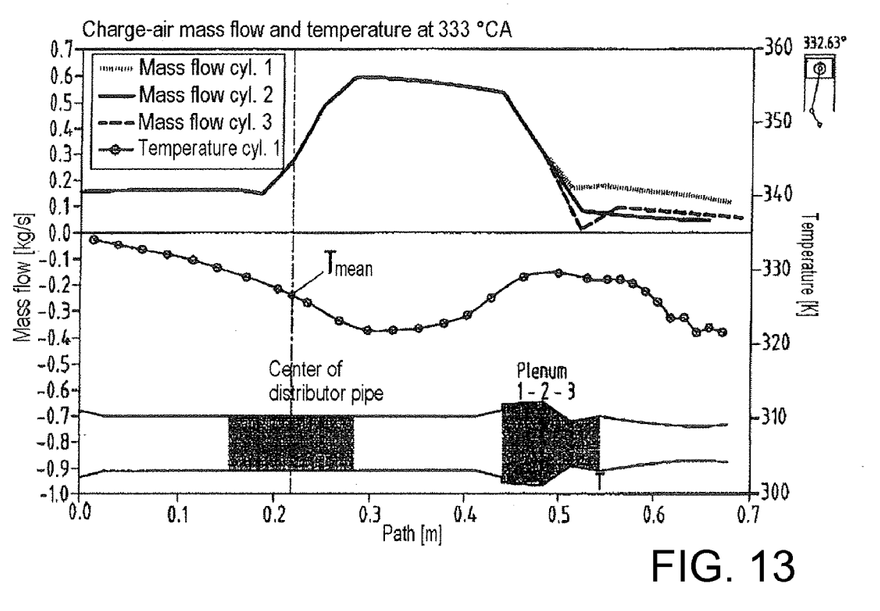
FIG. 13 shows a mass flow and temperature profile in the distributor pipe of the air intake system as per FIG. 1 at a time before charge-exchange top dead center.
Figure 14:
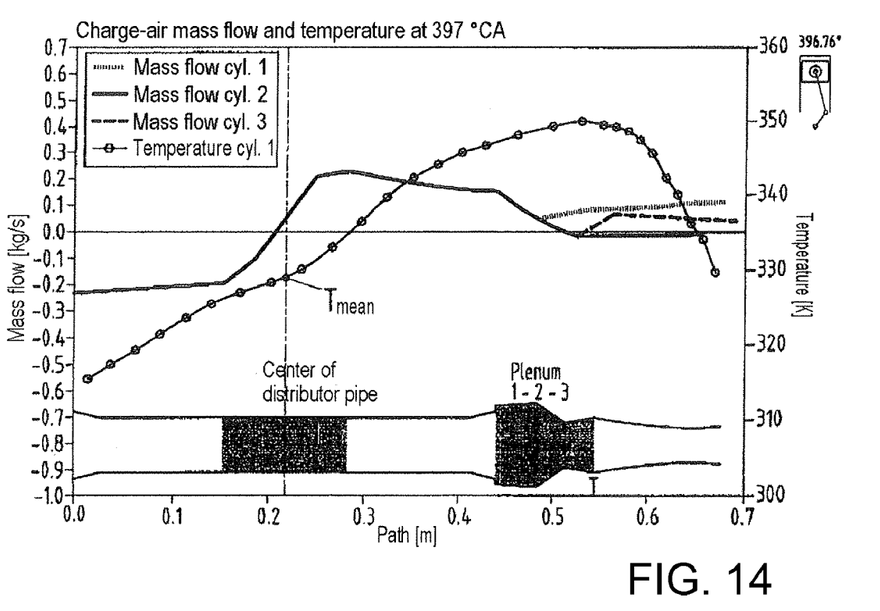
FIG. 14 shows a mass flow and temperature profile in the distributor pipe of the air intake system as per FIG. 1 at a time after charge-exchange top dead center.

FIGS. 13 to 16 illustrate the three-dimensional vibration form as occurs in the air intake system 3 according to the invention. Here, the mass flow in the distributor pipe and in the respective intake pipes of a cylinder bank is illustrated. During engine operation, the air mass oscillates within the air intake system 3 about the center of the distributor pipe as a result of the opening and closing of the inlet valves being offset in terms of time. Accordingly, the air mass oscillates back and forth between the two plenums 6 about the center of the distributor pipe. The different path positions at the right-hand end of FIGS. 13 to 16 result from the different path lengths through the plenum 6 of the cylinder bank, in this case cylinders 1, 2 and 3. For illustrative reasons, the cylinder bank 1-2-3 is illustrated at the right-hand side in FIGS. 13 to 16. That is to say, the observer is looking counter to the direction of travel A of the vehicle. Here, the illustrated path begins at zero at a transition B from the plenum 6 of the opposite cylinder bank, in this case cylinders 4, 5 and 6. The introduction of the charge air through a throttle flap connector accordingly takes place in the center of the distributor pipe, that is to say at a path of 0.22 meters. In FIG. 13, the charge air then flows overall in the direction of the cylinder bank 1-2-3, with the image in FIG. 13 showing an instantaneous situation which corresponds to a time shortly before charge-exchange top dead center CE-TDC. The illustration in FIG. 14 likewise represents an instantaneous situation which corresponds, in contrast to FIG. 13, to a piston position which is 60° crank angle later than that from FIG. 13.

Figure 15:
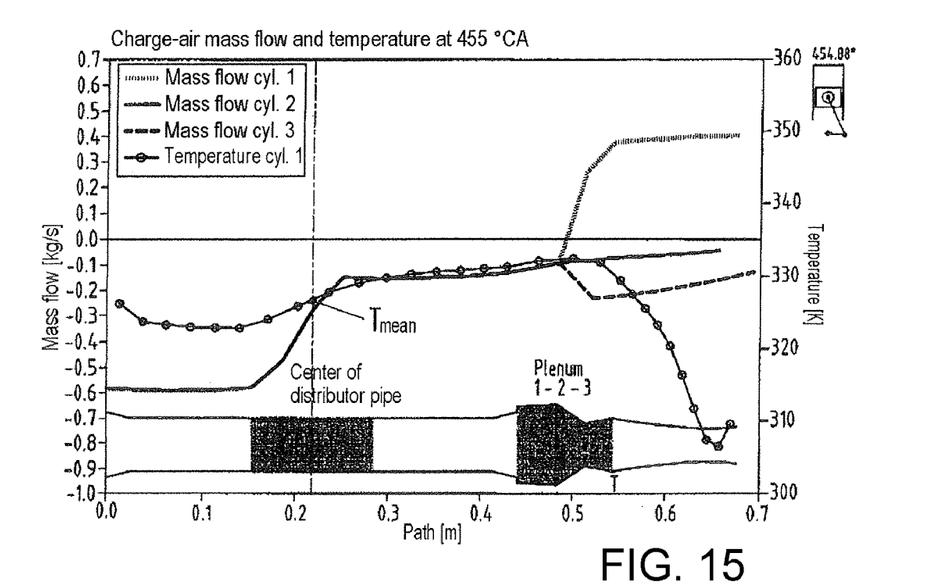
FIG. 15 shows a mass flow and temperature profile in the distributor pipe of the air intake system as per FIG. 1 at a time between charge-exchange top dead center and bottom dead center.
Figure 16:
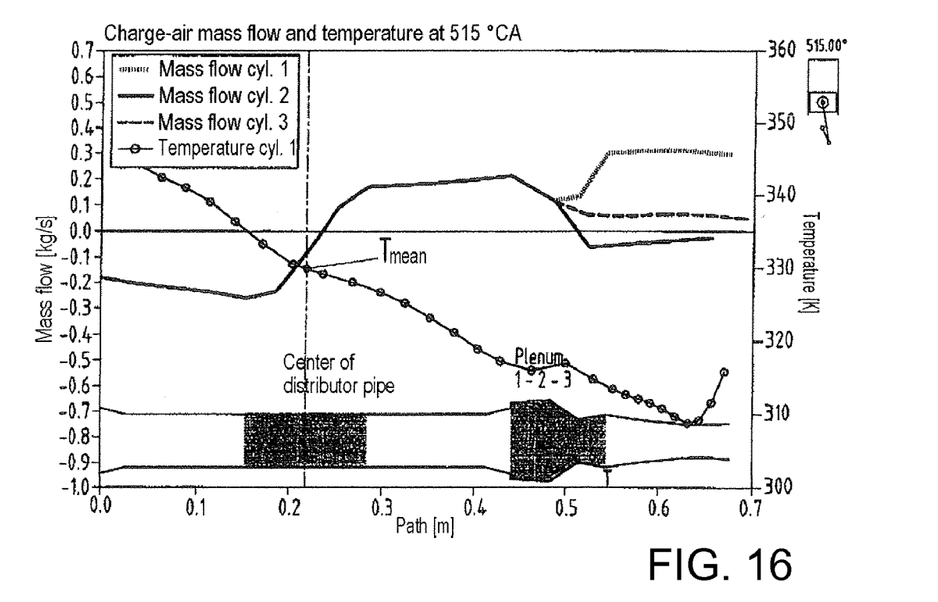
FIG. 16 shows a mass flow and temperature profile in the distributor pipe of the air intake system as per FIG. 1 at bottom dead center.

Furthermore, FIG. 15 likewise illustrates an instantaneous situation which corresponds to a time at which the piston is situated between charge-exchange top dead center and bottom dead center. In this illustration of FIG. 15, the air intake process for cylinder no. 1 is illustrated, with the intake of air taking place here between the time of maximum piston speed and shortly before a maximum inlet valve lift is reached. At said time, the charge air oscillates in the intake system in the direction of the opposite cylinder bank to cylinder no. 6. In the internal combustion engine illustrated here, the ignition sequence is 1, 6, 2, 4, 3 and 5. Accordingly, in the intake pipe 7 of cylinder no. 1, the air is drawn to the right, such that the charge air expands in the plenum 6. This results in an air temperature more than 20° below the mean value $T_{mean}$ as per FIG. 16. FIGS. 13 to 16 illustrate four instants in time within one cycle of the charge-air oscillation with a crank angle oscillation duration of 240°. This results from the fact that the present internal combustion engine runs through three cycles per four-stroke cycle within 720° crank angle. A significant temperature reduction of the charge air below the mean value $T_{mean}$ is obtained by means of the air intake system 3 according to the invention.

The invention claimed is:

1. An internal combustion engine, comprising:
a plurality of cylinders each formed with a combustion chamber delimited between a piston and a cylinder head;
an air intake system and a compressor for feeding combustion air into said combustion chamber;
said air intake system including at least one distributor pipe, a plurality of intake pipes connected to said cylinders, and at least one plenum positioned between said distributor pipe and said intake pipes;
a guiding duct communicating with said distributor pipe for feeding combustion air to said air intake system;
wherein a charge pressure of the combustion air is reduced between an outlet out of said compressor and an inlet into said combustion chamber;
wherein said air intake system having means for causing at least a portion of an air mass flows into said combustion chamber during an expansion phase of the air mass in the air intake system; and
a maximum length of said distributor pipe is smaller than a length $L_2$ defined by the following formula:

$$L_2 = 7.2 * 10^6 / n_N - 1.5 * L_S;$$

where $L_S$ is a respective length of said intake pipe and $n_N$ is a nominal rotational speed of the internal combustion engine.

2. The internal combustion engine according to claim 1, wherein a length of said distributor pipe is dimensioned such that, at a time of the intake of air, a decrease of a charge pressure within the air intake system is obtained.

3. The internal combustion engine according to claim 1, wherein, at a time of the intake of air, a temperature of the air mass aspirated by a respective said cylinder is reduced between said plenum and said combustion chamber of the internal combustion engine.

4. The internal combustion engine according to claim 3, wherein a reduction in the temperature of the air mass below a mean temperature value takes place during a crank angle range of between 90° after a charge-exchange top dead center position of said piston and 20° after a charge-exchange bottom dead center position of said piston.

5. The internal combustion engine according to claim 1, wherein said air intake system is configured with a distributor pipe length dimensioned in dependence on an equivalent distributor pipe diameter.

6. The internal combustion engine according to claim 5, wherein a ratio of the equivalent distributor pipe diameter to the distributor pipe length lies between 0.05 and 0.14.

7. The internal combustion engine according to claim 5, wherein a ratio of the equivalent distributor pipe diameter to the distributor pipe length lies between 0.06 and 0.13.

8. The internal combustion engine according to claim 1, wherein said intake pipe has an intake pipe length shorter than 200 mm.

9. The internal combustion engine according to claim 1, wherein said intake pipe length is shorter than 150 mm.

10. The internal combustion engine according to claim 1, wherein said at least one plenum of said air intake system is one of two plenums, said distributor pipe is formed from a distributor module and two distributor pipe sections respectively disposed between said distributor module and one of said two plenums.

11. The internal combustion engine according to claim 1, wherein said internal combustion engine is a spark-ignition internal combustion engine with an even number of cylinders.

12. The internal combustion engine according to claim 11, wherein said spark-ignition internal combustion engine is a Boxer engine and the number of cylinders is selected from the group consisting of four, six, and eight.

13. An internal combustion engine, comprising:
a plurality of cylinders each formed with a combustion chamber delimited between a piston and a cylinder head;
an air intake system and a compressor for feeding combustion air into said combustion chamber;
said air intake system including at least one distributor pipe, a plurality of intake pipes connected to said cylinders, and at least one plenum positioned between said distributor pipe and said intake pipes;
wherein a minimum length of said distributor pipe is greater than a length $L_1$ defined by the following formula:

$$L_1 = 200 - \tfrac{1}{3} * L_S + 1.7 * n_N^{-2.22} * (D_V - 30);$$

where $L_S$ is a respective length of said intake pipe, $n_N$ is a nominal rotational speed of the internal combustion engine, and $D_V$ is an equivalent distributor pipe diameter;
a guiding duct communicating with said distributor pipe for feeding combustion air to said air intake system; and
wherein due to dimensioning of said distributor pipe and said intake pipe a charge pressure of the combustion air is reduced between an outlet out of said compressor and an inlet into said combustion chamber and at least a portion of an air mass flows into said combustion chamber during an expansion phase of the air mass in the air intake system.

14. The internal combustion engine according to claim 1, wherein said distributor pipe is a first distributor pipe, and further comprising a second, switchable distributor pipe.

15. The internal combustion engine according to claim 14, which comprises a switching flap disposed in said second distributor pipe, for adjusting an equivalent distributor pipe diameter.

16. The internal combustion engine according to claim 1, which further comprises an exhaust-gas turbocharger with a variable turbine geometry.

17. The internal combustion engine according to claim 1, wherein an additional increase in the charge pressure by the compressor is adjustable to a charge pressure value lying between 5% and 15% above a value between 0.9 bar and 1.5 bar.

18. The internal combustion engine according to claim 1, wherein an expansion obtained within said air intake system is adjustable in dependence on operating parameters.

19. The internal combustion engine according to claim 18, wherein the expansion obtained within said air intake system is adjustable in dependence on a rotational speed of the internal combustion engine.

20. An internal combustion engine, comprising:
a plurality of cylinders each formed with a combustion chamber delimited between a piston and a cylinder head;
an air intake system and a compressor for feeding combustion air into said combustion chamber;
said air intake system including at least one distributor pipe, a plurality of intake pipes connected to said cylinders, and at least one plenum positioned between said distributor pipe and said intake pipes;
wherein a length of said distributor pipe ($L_V$) is greater than a length $L_1$ defined by a first formula:

$$L_1 = 200 - \tfrac{1}{3} * L_S + 1.7 * n_N^{-2.22} * (D_V - 30);$$

the length of said distributor pipe is smaller that a length $L_2$ defined by a second formula:

$$L_2 = 7.2 * 10^6 / n_N - 1.5 * L_S;$$

where $L_S$ is a respective length of said intake pipe, $n_N$ is a nominal rotational speed of the internal combustion engine, and $D_V$ is an equivalent distributor pipe diameter;
a guiding duct communicating with said distributor pipe for feeding combustion air to said air intake system; and
wherein due to dimensioning of said distributor pipe and said intake pipe a charge pressure of the combustion air is reduced between an outlet out of said compressor and an inlet into said combustion chamber and at least a portion of an air mass flows into said combustion chamber during an expansion phase of the air mass in the air intake system.

21. The internal combustion engine according to claim 1, wherein a minimum length of said distributor pipe is greater than a length $L_3$ defined by the following formula:

$$L_3 = 34 * D_V - 650 * \tfrac{4}{3} L_S;$$

where $L_S$ is a respective length of said intake pipe and $D_V$ is an equivalent distributor pipe diameter.

22. An internal combustion engine, comprising:
a plurality of cylinders each formed with a combustion chamber delimited between a piston and a cylinder head;
an air intake system and a compressor for feeding combustion air into said combustion chamber;
said air intake system including at least one distributor pipe, a plurality of intake pipes connected to said cylinders, and at least one plenum positioned between said distributor pipe and said intake pipes;
wherein a length of said distributor pipe is greater than a length $L_3$ defined by the formula:

$$L_3 = 34 * D_V - 650 * \tfrac{4}{3} L_S;$$

the length of said distributor pipe is smaller than a length $L_2$ defined by the formula:

$$L_2 = 7.2 * 10^6 / n_N - 1.5 * L_S;$$

where $L_s$ is a respective length of said intake pipe, $n_N$ is a nominal rotational speed of the internal combustion engine, and $D_V$ is an equivalent distributor pipe diameter;

a guiding duct communicating with said distributor pipe for feeding combustion air to said air intake system; and wherein due to dimensioning of said distributor pipe and said intake pipe a charge pressure of the combustion air is reduced between an outlet out of said compressor and an inlet into said combustion chamber and at least a portion of an air mass flows into said combustion chamber during an expansion phase of the air mass in the air intake system.

* * * * *